US012621912B2

(12) United States Patent
Höflinger et al.

(10) Patent No.: US 12,621,912 B2
(45) Date of Patent: May 5, 2026

(54) OPTOELECTRONIC MODULE AND METHOD FOR PRODUCING AN OPTOELECTRONIC MODULE

(71) Applicant: ams-OSRAM International GmbH, Regensburg (DE)

(72) Inventors: Benjamin Höflinger, Regensburg (DE); Markus Klein, Tegernheim (DE); Stefan Kerscher, Bruck In der Oberpfalz (DE); Christian Brandl, Sinzing (DE); Sebastian Stigler, Scharmassing (DE); Martin Moritz, Regensburg (DE); Michael Elssner, Regensburg (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 131 days.

(21) Appl. No.: 18/266,533

(22) PCT Filed: Nov. 18, 2021

(86) PCT No.: PCT/EP2021/082182
§ 371 (c)(1),
(2) Date: Jun. 9, 2023

(87) PCT Pub. No.: WO2022/122342
PCT Pub. Date: Jun. 16, 2022

(65) Prior Publication Data
US 2024/0049373 A1 Feb. 8, 2024

(30) Foreign Application Priority Data
Dec. 10, 2020 (DE) ..................... 10 2020 132 948.2

(51) Int. Cl.
*H05B 45/28* (2020.01)
*H05B 45/325* (2020.01)

(52) U.S. Cl.
CPC ........... *H05B 45/28* (2020.01); *H05B 45/325* (2020.01)

(58) Field of Classification Search
CPC ........ H05B 45/18; H05B 45/28; H05B 45/30; H05B 45/42; H05B 45/52; H05B 45/54;
(Continued)

(56) References Cited

U.S. PATENT DOCUMENTS 6,130,700 A * 10/2000 Murayama ......... H04N 1/40043 347/240
8,791,645 B2 * 7/2014 Saccomanno ........ G09G 3/3406 315/159
(Continued)

FOREIGN PATENT DOCUMENTS

CN 108605396 A 9/2018
CN 109937480 A 6/2019
(Continued)

OTHER PUBLICATIONS

International Search Report issued for corresponding International Patent Application No. PCT/EP2021/082182 on Mar. 14, 2022, along with an English translation (5 pages).
(Continued)

*Primary Examiner* — Tung X Le
(74) *Attorney, Agent, or Firm* — Hauptman Ham, LLP

(57) ABSTRACT

An optoelectronic module includes a control element, at least one temperature sensor, and at least one semiconductor emitter unit. The semiconductor emitter unit includes at least a first emitter and a second emitter. The first emitter is intended to emit electromagnetic radiation in a first wavelength range. The second emitter is intended to emit electromagnetic radiation in a second wavelength range different from the first wavelength range. The control element includes a memory unit and a driver output for each emitter.
(Continued)

Figure 1:
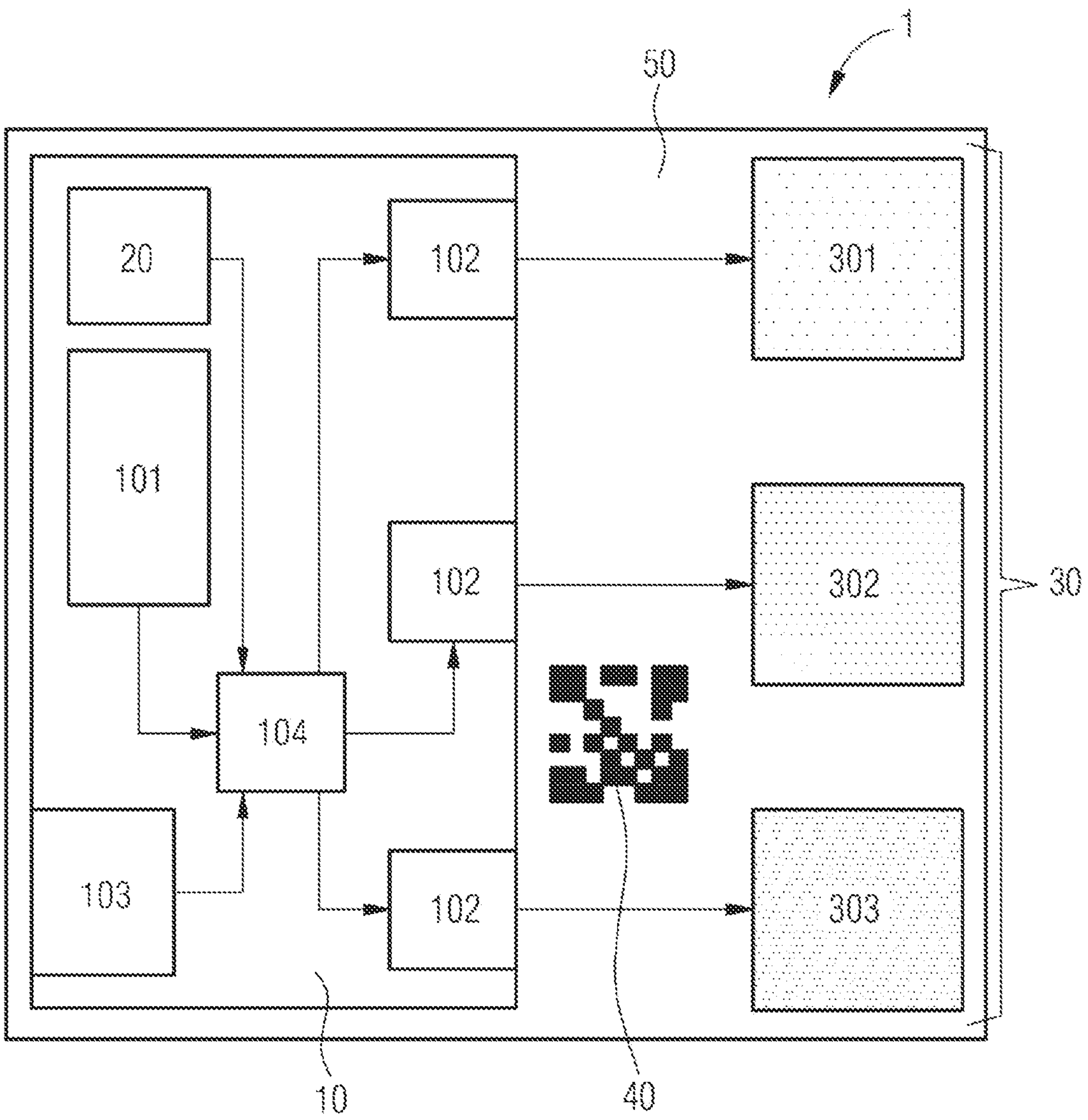

The temperature sensor determines a temperature. Each emitter is assigned a non-linear characteristic curve in the memory unit. The control element is intended to drive the emitters independently of each other by means of a respective driver output. The control element controls the emitters depending on the determined temperature and the respective characteristic curve of the emitter.

15 Claims, 3 Drawing Sheets

(58) Field of Classification Search
CPC .. H05B 45/325; H05B 45/395; H05B 47/105; H05B 47/125
See application file for complete search history.

(56) References Cited

U.S. PATENT DOCUMENTS

| | | | | |
|---|---|---|---|---|
| 9,055,622 | B2 * | 6/2015 | Aldrich | G01J 3/501 |
| 10,874,006 | B1 * | 12/2020 | Davis | H05B 45/20 |
| 2011/0133654 | A1 * | 6/2011 | McKenzie | H05B 45/22 257/89 |
| 2012/0187845 | A1 | 7/2012 | Saes et al. | |
| 2014/0035472 | A1 * | 2/2014 | Raj | H05B 45/22 315/297 |
| 2015/0382424 | A1 | 12/2015 | Knapp et al. | |
| 2016/0183344 | A1 * | 6/2016 | Chitta | H05B 47/155 700/86 |
| 2019/0027082 | A1 * | 1/2019 | Van Belle | G09G 3/2003 |
| 2019/0215927 | A1 * | 7/2019 | Sooch | H05B 47/16 |
| 2019/0242539 | A1 * | 8/2019 | Roberts | H05B 47/12 |
| 2021/0037624 | A1 | 2/2021 | Sorensen et al. | |
| 2021/0235566 | A1 * | 7/2021 | Haverlag | H05B 47/175 |
| 2021/0376200 | A1 * | 12/2021 | Kim | H05B 45/22 |

FOREIGN PATENT DOCUMENTS

| | | | |
|---|---|---|---|
| DE | 10 2007 044 556 | A1 | 3/2009 |
| DE | 10 2013 201 915 | A1 | 5/2014 |
| DE | 10 2018 004 826 | A1 | 12/2019 |
| EP | 2 273 851 | A2 | 1/2011 |
| GB | 2 425 881 | A | 11/2006 |
| KR | 10-2018-0114914 | A | 10/2018 |
| WO | 2010/069933 | A2 | 6/2010 |
| WO | 2016/206996 | A1 | 12/2016 |
| WO | 2017/153026 | A1 | 9/2017 |

OTHER PUBLICATIONS

Written Opinion issued for corresponding International Patent Application No. PCT/EP2021/082182 on Mar. 14, 2022.

* cited by examiner

OPTOELECTRONIC MODULE AND METHOD FOR PRODUCING AN OPTOELECTRONIC MODULE

CROSS REFERENCE TO RELATED APPLICATION

This application is a National Stage of International Application No. PCT/EP2021/082182, filed on Nov. 18, 2021, which designates the United States and was published in Europe, and which claims priority to German Patent Application No. 10 2020 132 948.2, filed on Dec. 10, 2020, in the German Patent Office. All of the aforementioned applications are hereby incorporated by reference in their entireties.

An optoelectronic module and a method for producing an optoelectronic module are provided.

In particular, the optoelectronic module is intended to generate electromagnetic radiation, preferably light that is perceptible to the human eye.

A task to be solved is to specify an optoelectronic module that enables a particularly accurate reproduction of electromagnetic radiation with a desired color locus and brightness.

According to at least one embodiment, the optoelectronic module comprises a control element, at least one temperature sensor and at least one semiconductor emitter unit. The control element is provided for controlling the semiconductor emitter unit. The temperature sensor determines a temperature of the semiconductor emitter unit. The semiconductor emitter unit is formed with a semiconductor material and is provided for emitting electromagnetic radiation in different wavelength ranges.

According to at least one embodiment of the optoelectronic module, the semiconductor emitter unit comprises at least a first emitter and a second emitter. Preferably, the emitters are designed as semiconductor diodes. Semiconductor diodes are simple and inexpensive to manufacture and have a long service life. Semiconductor diodes are advantageously available with different emission wavelength ranges. The emitters can be controlled separately and are each intended to emit electromagnetic radiation in different wavelength ranges. By varying the brightness of the individual emitters, a mixed radiation can be generated which has a varying color locus.

According to at least one embodiment of the optoelectronic module, the first emitter is intended to emit electromagnetic radiation in a first wavelength range. The first wavelength range comprises, in particular, a range of the electromagnetic spectrum that is perceptible to the human eye. Preferably, the first wavelength range corresponds to a primary color, for example red, green or blue.

According to at least one embodiment of the optoelectronic module, the second emitter is intended to emit electromagnetic radiation in a second wavelength range different from the first wavelength range. The second wavelength range corresponds, for example, to a different primary color than the first wavelength range. In particular, the first wavelength range and the second wavelength range may at least partially overlap.

According to at least one embodiment of the optoelectronic module, the control element comprises a memory unit and one driver output for each emitter. The memory unit is intended in particular for storing digital information. Preferably, the memory unit is a non-volatile memory.

Each driver output is intended to supply an emitter with an operating current. The driver outputs are in particular controllable current or voltage sources. Each emitter is preferably assigned exactly one driver output. This means that each emitter can be controlled individually.

According to at least one embodiment of the optoelectronic module, each emitter is assigned a nonlinear characteristic curve in the memory unit. A nonlinear characteristic curve is characterized by having a plurality of different slope values. For example, a current-voltage characteristic curve of a semiconductor diode can be described with a nonlinear characteristic curve.

According to at least one embodiment of the optoelectronic module, the nonlinear characteristic curve of each emitter corresponds to a characteristic curve measured in advance by this emitter. In other words, a component-specific calibration of all emitters is performed. By means of a component-specific calibration, non-linear characteristic curves are measured in advance for each emitter, which can then be stored as non-linear characteristic curves in the memory unit. Advantageously, such a component-specific calibration can be used for particularly precise compensation of external influences, such as ambient temperature.

According to at least one embodiment of the optoelectronic module, the control element is intended to drive the emitters independently of each other by means of a respective driver output. This allows the control element to set any desired mixed color that is emitted by the semiconductor emitter unit. Depending on the actuation of the individual emitters, electromagnetic radiation with a predetermined color location and a predetermined brightness can thus be emitted by the semiconductor emitter unit.

According to at least one embodiment of the optoelectronic module, the control element controls the emitters depending on the determined temperature and the respective characteristic curve of the emitter. In particular, compensation of temperature influences is achieved in this way.

According to at least one embodiment, the optoelectronic module comprises a control element, at least one temperature sensor, and at least one semiconductor emitter unit, wherein

- the semiconductor emitter unit comprises at least a first emitter and a second emitter,
- the first emitter is intended to emit electromagnetic radiation in a first wavelength range,
- the second emitter is intended to emit electromagnetic radiation in a second wavelength range different from the first wavelength range,
- the control element comprises a memory unit, and one driver output for each emitter,
- the temperature sensor detects a temperature,
- each emitter is assigned a non-linear characteristic curve in the memory unit,
- the control element is intended to control the emitters independently of each other by means of a respective driver output, and
- the control element controls the emitters depending on the determined temperature and the respective characteristic curve of the emitter.

An optoelectronic module described here is based on the following considerations, among others: The brightness of a semiconductor emitter unit decreases with increasing temperature. For emitters intended for emission in a red wavelength range, this effect is typically much more pronounced in a temperature range of −40° C. to 125° C. than for emitters intended for emission in a blue or green wavelength range. As a result, not only a brightness but also a chromaticity coordinate of a displayed mixed color of an optoelectronic module changes depending on the temperature of the emitters. As the temperature increases, the contribution of a red emitter to the mixed color decreases more than that of a green or blue emitter. In addition, the control element and the temperature sensor also show a temperature dependence, which can lead to a further variation of the brightness and the color location of the mixed radiation emitted by the optoelectronic module.

The optoelectronic module described here makes use, among other things, of the idea of determining a non-linear characteristic curve by measuring the variation in brightness of the individual emitters at different temperatures, as a function of which the individual emitters are controlled. This non-linear characteristic curve can include a variation of the brightness for an emitter, as well as a variation of the operating current through the control element and variations in the temperature sensor used. The optoelectronic module includes a memory unit comprising a characteristic curve for each emitter, and a temperature sensor for measuring the current operating temperature. Thus, by means of the characteristic curve for each emitter and the determined temperature, compensation of temperature effects can be performed. This makes it possible to provide an optoelectronic module that emits mixed radiation with a desired brightness and color location regardless of the operating temperature.

According to at least one embodiment of the optoelectronic module, the semiconductor emitter unit comprises a third emitter intended to emit electromagnetic radiation in a third wavelength range different from the first and second wavelength ranges. In particular, the semiconductor emitter unit thus forms an RGB unit. An RGB unit includes an emitter intended to emit electromagnetic radiation in the red wavelength region, an emitter intended to emit electromagnetic radiation in the green wavelength region, and an emitter intended to emit electromagnetic radiation in the blue wavelength region. This allows the RGB unit to emit mixed radiation with a color locus that lies within a triangle spanned by the emitters in color space.

According to at least one embodiment of the optoelectronic module, the semiconductor emitter unit has an identifier. An identifier permits unambiguous identification of a semiconductor emitter unit. A unique identification is particularly advantageous for assigning a determined characteristic curve to the respective emitter.

According to at least one embodiment of the optoelectronic module, the identifier is an optically readable mark. For example, the identifier is a bar code or a two-dimensional code, for example a QR code or a DataMatrix. An optically readable marking can be read, for example, by a camera system during the assembly of the optoelectronic module on a printed circuit board.

According to at least one embodiment of the optoelectronic module, the identifier is stored as a digital ID in the memory unit of the control element. Here and in the following, ID is to be understood as an identification string. Since a digital ID does not take up any space in a visible area of the optoelectronic module, its use on very small components is advantageous. A minimum size of the optoelectronic module is therefore advantageously not predetermined by an extent of an optical mark. In particular, the identifier can be stored in an optoelectronic module both as a digital ID and as an optically readable mark. In this way, the information of the identifier can advantageously be stored redundantly.

According to at least one embodiment of the optoelectronic module, the semiconductor emitter unit is arranged together with the control element in a housing. In particular, the semiconductor emitter unit and the control element are embedded in a common housing. For example, the housing is formed with a polymer. This enables a particularly simple and stable design of the optoelectronic module.

According to at least one embodiment of the optoelectronic module, the temperature sensor is integrated in the control element. This enables a particularly cost-effective and space-saving integration of the temperature sensor in the optoelectronic module. Furthermore, this enables a particularly precise detection of the temperature of the control element. This enables particularly precise compensation of temperature-dependent variations in the control element. In particular, temperature-dependent variations of the driver outputs are compensated in this way.

According to at least one embodiment of the optoelectronic module, the temperature sensor is integrated in the semiconductor emitter unit. Thus, a particularly precise detection of the temperature of the semiconductor emitter unit by the temperature sensor is achieved. Since the temperature sensor has a particularly small distance to the semiconductor emitter unit, a temperature measured by the temperature sensor corresponds very closely to the temperature of the semiconductor emitter unit.

According to at least one embodiment of the optoelectronic module, the control element is set up to control the emitters by means of a PWM signal (pulse width modulation). Control by means of a PWM signal enables particularly simple and finely divisible control of the brightness of the emitters. In particular, the control element is set up to modulate an operating current of the emitters by means of PWM.

According to at least one embodiment of the optoelectronic module, the nonlinear characteristic curves represent a relationship between a control signal of an emitter to be specified as a function of temperature. The control signal is, for example, a pulse width of a PWM signal to be specified.

According to at least one embodiment of the optoelectronic module, the control element comprises a communication interface. The communication interface is set up in particular for communication with a data bus system. For example, the semiconductor emitter unit is controlled as a function of a parameter transmitted by the communication interface. For example, the communication interface is set up for communication in a serial bus system in the form of a daisy chain.

According to at least one embodiment of the optoelectronic module, the optoelectronic module comprises a plurality of semiconductor emitter units, each semiconductor emitter unit being driven by a common control element. This results in a particularly simple structure of the optoelectronic module, in which a plurality of control elements can be dispensed with. The control element can store a characteristic curve for each semiconductor emitter unit in the memory unit. In particular, the control element has a separate driver output for each emitter.

A method for producing an optoelectronic module is further disclosed. In particular, the optoelectronic module can be produced by a method described herein. That is, all features disclosed in connection with the optoelectronic module are also disclosed for the method for producing it, and vice versa.

According to at least one embodiment of the method for producing an optoelectronic module, an optoelectronic module is provided with an identifier. The optoelectronic module further comprises a control element, at least one temperature sensor, and at least one semiconductor emitter unit, wherein the semiconductor emitter unit comprises at least a first emitter and a second emitter, the first emitter is intended to emit electromagnetic radiation in a first wavelength range, the second emitter is intended to emit electromagnetic radiation in a second wavelength range different from the first wavelength range, the control element comprises a memory unit, and one driver output for each emitter, the temperature sensor detects a temperature, each emitter is assigned a non-linear characteristic curve in the memory unit, the control element is arranged to control the emitters independently of each other by means of a respective driver output, and the control element controls the emitters depending on the determined temperature and the respective characteristic curve of the emitter.

According to at least one embodiment of the method for producing an optoelectronic module, a determination of the first and second wavelength range and a first and second brightness of the emitters is performed at a first temperature. For this purpose, each emitter is supplied with an operating current and its emitted radiation is measured. Advantageously, this measurement is performed simultaneously for a plurality of emitters.

According to at least one embodiment of the method for producing an optoelectronic module, the determination of the first and second wavelength range and of a first and second brightness of the emitters is repeated at a second temperature which is different from the first temperature. Thus, another supporting point for a temperature-dependent characteristic curve of the brightness of the emitters is obtained. This step can be repeated even further to obtain a desired number of supporting points.

According to at least one embodiment of the method for producing an optoelectronic module, a temperature-dependent characteristic curve of the first and second wavelength range and the first and second brightness of each emitter is determined. The characteristic curve is determined in particular on the basis of the measured supporting points with the aid of specific fit functions. The fit functions take into account, for example, the physical laws of the brightness characteristics, current characteristics and temperature-dependent measurement deviations. In particular, the characteristic curve determined has a non-linear curve. The determined characteristic curve is stored in the control element as a quantitative description, for example in the form of a look-up table. This minimizes the computational effort in the control element.

According to at least one embodiment of the method for producing an optoelectronic module, the identifier of the module is read out and the characteristic curve determined is assigned to the identifier read out. In this way, each emitter can be assigned a characteristic curve specific to it, which also takes into account the temperature dependencies of the control element and of the temperature sensor.

According to at least one embodiment of the method for producing an optoelectronic module, the method comprises the following steps:

A) Providing an optoelectronic module with an identifier,

B) Determine the first and second wavelength ranges and a first and second brightness of the emitters at a first temperature, C) Repeat step B) at a second temperature different from the first temperature, D) determining a temperature-dependent characteristic curve of each of the first and second wavelength ranges and the first and second brightnesses of each emitter; and E) Reading the module's identifier and assigning the determined characteristic curve to the identifier.

According to at least one embodiment of the method for producing an optoelectronic module, the characteristic curves determined are written to the memory unit of the control element in a further step F). Thus, the optoelectronic module has a specific characteristic curve for each emitter contained therein as a function of temperature. The optoelectronic module can therefore be used immediately by an end user.

According to at least one embodiment of the method for producing, in a step F) the determined characteristic curves are transmitted to a server of a network for providing the characteristic curves in the network. In particular, the network is connected to the Internet. The respective characteristic curves can thus be made available to the end user. The end user can thereby combine different semiconductor emitter units with a control element as desired and subsequently insert the respective corresponding characteristic curves into the control element. This enables semiconductor emitter units and control modules to be sold separately.

An optoelectronic module described here is particularly suitable for use in, for example, an interior lighting system of a motor vehicle or an aircraft.

Further advantages and advantageous embodiments and further developments of the optoelectronic module result from the following embodiments shown in connection with the figures.

Figure 2:
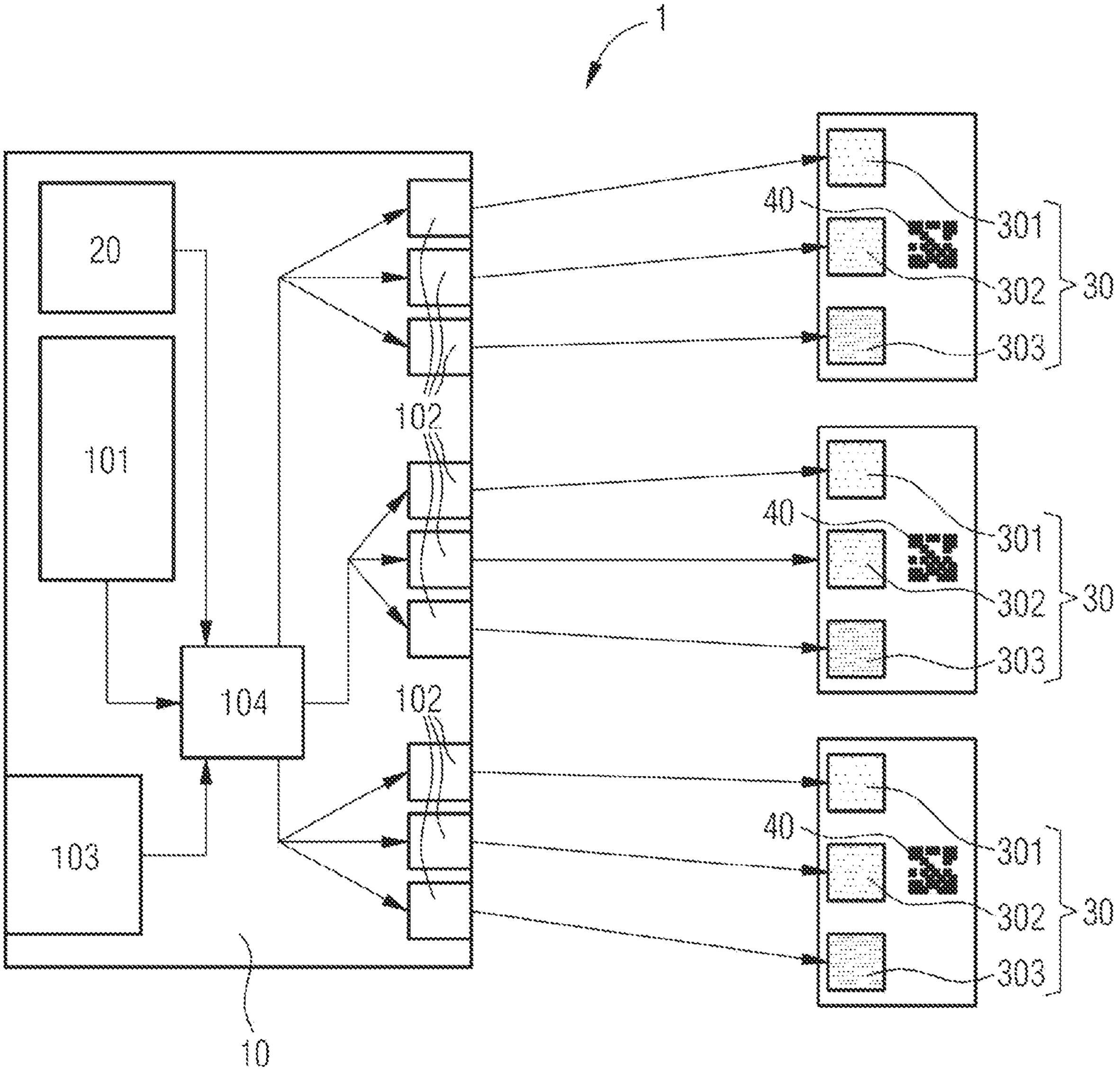
Figure 3:
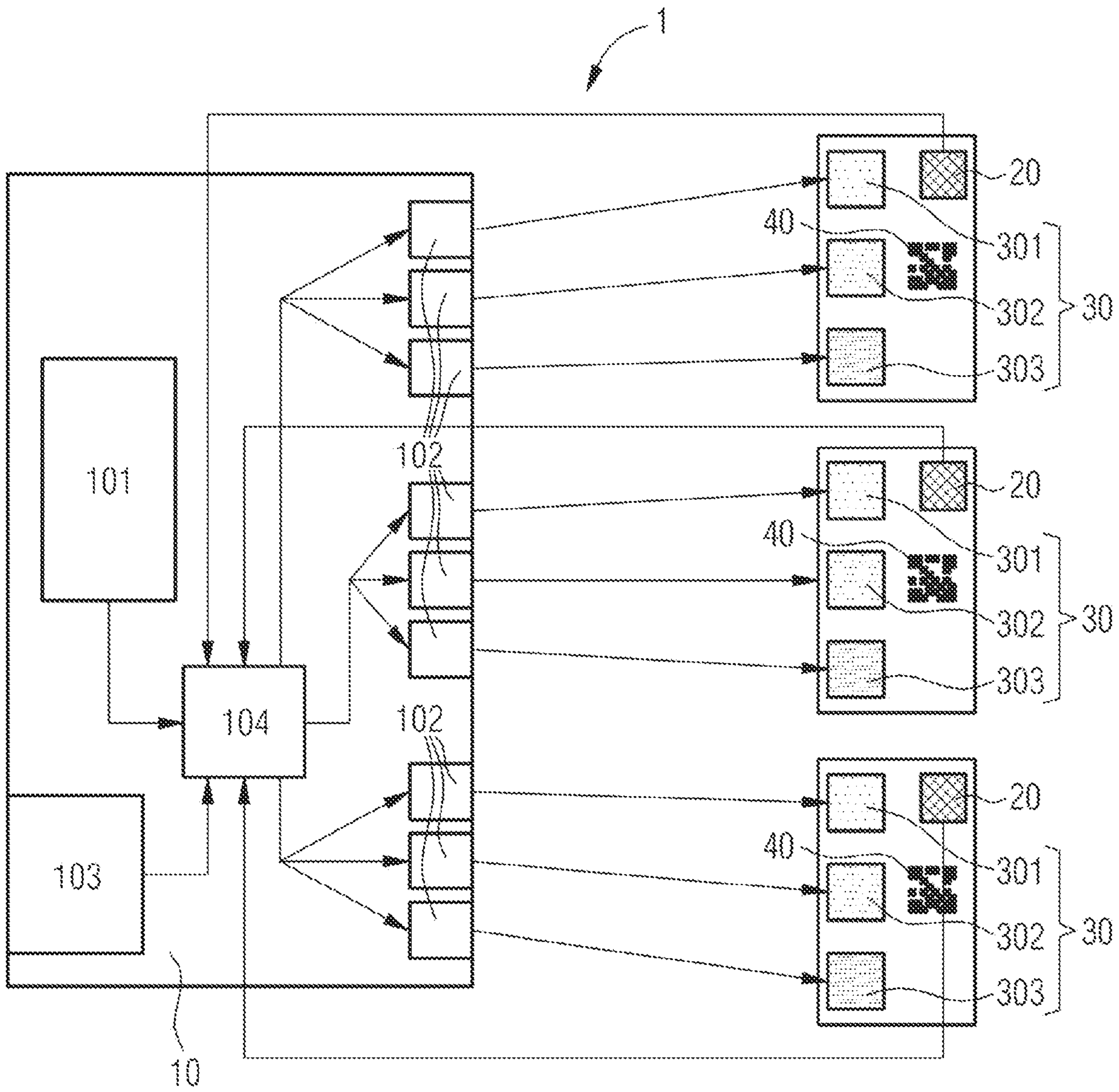

Showing in:

FIG. 1 a schematic view of an optoelectronic module described herein according to a first embodiment, FIG. 2 a schematic view of an optoelectronic module described herein according to a second embodiment, and FIG. 3 a schematic view of an optoelectronic module described herein according to a third embodiment.

Elements that are identical, similar or have the same effect are given the same reference signs in the figures. The figures and the proportions of the elements shown in the figures are not to be regarded as to scale. Rather, individual elements may be shown exaggeratedly large for better representability and/or for better comprehensibility.

FIG. 1 shows a schematic view of an optoelectronic module 1 described herein according to the first embodiment. The optoelectronic module 1 comprises a control element 10, a semiconductor emitter unit 30 and a housing 50.

The semiconductor emitter unit 30 comprises a first emitter 301, a second emitter 302 and a third emitter 303. The emitters 301, 302, 303 are designed as semiconductor diodes. Semiconductor diodes are particularly durable and insensitive to external environmental influences. The first emitter 301 is intended to emit electromagnetic radiation in a first wavelength range. The first wavelength range comprises electromagnetic radiation perceptible to the human eye in red. The second emitter 302 is intended to emit electromagnetic radiation in a second wavelength range. The second wavelength range comprises electromagnetic radiation perceptible to the human eye in green. The third emitter 303 is intended to emit electromagnetic radiation in a third wavelength range. The third wavelength range includes electromagnetic radiation perceptible to the human eye in blue. The semiconductor emitter unit 30 forms an RGB unit.

The control element 10 comprises a memory unit 101, a driver output 102 for each emitter 301, 302, 303, a communication interface 103, a central unit 104, and a temperature sensor 20. The memory unit 101 comprises a non-volatile digital memory. For example, the memory unit 101 is formed with a flash memory. The memory unit 101 is adapted to store a plurality of nonlinear characteristic curves. A specific nonlinear characteristic curve is included in the memory unit 101 for each emitter 301, 302, 303 of the semiconductor emitter unit 30.

The driver outputs 102 provide an operating current to each emitter 301, 302, 303 of the semiconductor emitter unit 30. In this regard, the operating current for each emitter 301, 302, 303 can be controlled using PWM modulation. Thus, the brightness of the emitters 301, 302, 303 can be adjusted individually. When controlling by means of a PWM signal, this is done particularly simply by varying the pulse width.

The communication interface 103 is connected to a data bus system. Via the communication interface 103, parameters for a desired color location as well as for a desired brightness of the emitted electromagnetic radiation can be transmitted to the optoelectronic module 1. The communication interface 103 is a serial interface that communicates with a plurality of control elements 10 in a data bus system, for example as part of a daisy chain arrangement.

The temperature sensor 20 is integrated in the control element 10. The temperature sensor 20 measures the temperature of the control element 10. Since the semiconductor emitter unit 30 and the control element 10 are integrated in a common housing 50, the temperature measured by the temperature sensor 20 also corresponds in a good approximation to the temperature of the emitters 301, 302, 303 of the semiconductor emitter unit 30.

The central unit 104 includes a logic circuit arranged to process digital signals. The central unit 104 controls the driver outputs 102 in response to a plurality of input parameters. The central unit 104 receives parameters for a desired color location and a desired brightness from the communication interface 103, a temperature measured by the temperature sensor 20, and a value of a characteristic curve from the memory unit 101.

Depending on the measured temperature and the characteristic, the central unit 104 controls each of the driver outputs 102 individually to generate an emission of an electromagnetic radiation of the desired color location in the emitters 301, 302, 303 of the semiconductor emitter unit 30 in the desired brightness. Determination of the temperature by the temperature sensor 20 and driving as a function of the temperature-dependent characteristic curves from the memory unit 101 enable compensation for temperature-dependent variations in the brightness and chromaticity of the electromagnetic radiation emitted by the optoelectronic module 1.

The control element 10 and the semiconductor emitter unit 30 are arranged in a common housing 50. The housing 50 is formed with a polymer that can be easily processed by a molding method. An optical identifier 40 in the form of a data matrix is applied to the housing 50. By means of the identifier 40, a unique identification of the optical module 1 is possible. The identifier 40 can also be stored in the memory unit 101. This means that the identifier is stored redundantly.

FIG. 2 shows a schematic view of an optoelectronic module 1 described herein according to the second exemplary embodiment. The optoelectronic module 1 shown in the second exemplary embodiment is substantially the same as the optoelectronic module 1 shown in the first exemplary embodiment. Unlike the optoelectronic module 1 shown in the first exemplary embodiment, the optoelectronic module 1 shown in the second exemplary embodiment has a plurality of semiconductor emitter units 30. By means of such a structure, a particularly simple and inexpensive control of a plurality of semiconductor emitter units 30 is possible, in which a plurality of control elements 10 can be dispensed with.

Each semiconductor emitter unit 30 respectively comprises at least a first emitter 301 intended to emit electromagnetic radiation in the red wavelength region, a second emitter 302 intended to emit electromagnetic radiation in the green wavelength region, and a third emitter 303 arranged to emit electromagnetic radiation in the blue wavelength region. Each semiconductor emitter unit 30 thus forms an RGB unit.

All semiconductor emitter units 30 are driven by a common control element 10. Each emitter 301, 302, 303 from each semiconductor emitter unit 30 is associated with a driver output 102 on the control element 10. Thus, each emitter 301, 302, 303 can be driven individually. This allows independent emission of a mixed radiation with a predefinable color location and brightness from each semiconductor emitter unit 30.

Each semiconductor emitter unit 30 comprises an identifier 40. The identifier 40 is designed as an optical identifier in the form of a data matrix. By means of the identifier 40, a unique identification of each semiconductor emitter unit 30 is possible.

Thus, an assignment of characteristic curves to the semiconductor emitter units 30 is simplified. In particular, the characteristic curves for the semiconductor emitter units can be written to the memory unit 101 of the control element 10 only afterwards. For example, the assignment of the semiconductor emitter units 30 to the control element 10 is performed only after an assembly on a printed circuit board. In this case, the identifiers 40 of the semiconductor emitter units 30 are detected by a camera system, and then the associated characteristic curves of the semiconductor emitter units 30 are retrieved from a server from a network on which the characteristic curves for the respective identifiers 40 are provided.

In the second embodiment of an optoelectronic module 1 shown in FIG. 2, a particularly good thermal coupling between the individual semiconductor emitter units 30 and the control element 10 in which the temperature sensor 20 is located is advantageous. For example, when the semiconductor emitter units 30 and the control element 10 are mounted on a common printed circuit board, a temperature of the temperature sensor 20 also corresponds in good approximation to a temperature of the respective semiconductor emitter units 30. In this way, a deviation between the temperature measured by the temperature sensor 20 and the actual temperature of the semiconductor emitter units 30 can be minimized.

FIG. 3 shows a schematic view of an optoelectronic module 1 described herein according to the third exemplary embodiment. The optoelectronic module 1 shown in the third exemplary embodiment is substantially the same as the second exemplary embodiment of an optoelectronic module 1 shown in FIG. 2. Unlike the second exemplary embodiment, the third exemplary embodiment shown in FIG. 3 comprises a plurality of temperature sensors 20 each integrated in the semiconductor emitter units 30.

Each semiconductor emitter unit 30 has its own temperature sensor 20. The control element 10 can thus advantageously remain free of a temperature sensor 20. The integration of the temperature sensors 20 into the semiconductor emitter units 30 enables a particularly precise detection of the actual temperature of the semiconductor emitter units 30. Advantageously, a thermal coupling of the semiconductor emitter unit 30 and the control element 10 can thus also be dispensed with. Even if the temperatures between the control element 10 and the semiconductor emitter units 30 differ greatly, the temperature of the semiconductor emitter units is thus correctly detected and the temperature effects of the semiconductor emitter units 30 are thus also correctly compensated.

The invention is not limited by the description based on the embodiments. Rather, the invention encompasses any new feature as well as any combination of features, which in particular includes any combination of features in the patent claims, even if this feature or combination itself is not explicitly stated in the patent claims or embodiments.

LIST OF REFERENCE SIGNS

1 optoelectronic module
10 control element
20 temperature sensor
30 semiconductor emitter unit
40 identifier
50 housing
101 memory unit
102 driver output
103 communication interface
104 central unit
301 first emitter
302 second emitter
303 third emitter

The invention claimed is:

1. An optoelectronic module comprising:
a control element,
at least one temperature sensor, and
at least one semiconductor emitter unit, wherein
the semiconductor emitter unit comprises at least a first emitter and a second emitter,
the first emitter is intended to emit electromagnetic radiation in a first wavelength range,
the second emitter is intended to emit electromagnetic radiation in a second wavelength range different from the first wavelength range,
the control element comprises a memory unit and a driver output for each emitter,
the temperature sensor determines a temperature of the semiconductor emitter unit,
each emitter is assigned a non-linear characteristic curve in the memory unit,
the non-linear characteristic curves are configured to compensate a variation of the brightness for each emitter, a variation of an operating current through the control element and a temperature dependence in the temperature sensor used,
the control element is intended to drive the emitters independently of each other by means of a respective driver output, and
the control element controls the emitters depending on the determined temperature and the respective characteristic curve of the emitter.

2. The optoelectronic module according to claim 1, wherein the semiconductor emitter unit comprises a third emitter intended to emit electromagnetic radiation in a third wavelength range different from the first and second wavelength ranges.

3. The optoelectronic module according to claim 1, wherein the semiconductor emitter unit is arranged together with the control element in a housing.

4. The optoelectronic module according to claim 1, wherein the temperature sensor is integrated in the control element.

5. The optoelectronic module according to claim 1, wherein the temperature sensor is integrated in the semiconductor emitter unit.

6. The optoelectronic module according to claim 1, wherein the control element is arranged to drive the emitters by means of a PWM signal.

7. The optoelectronic module according to claim 1, wherein the nonlinear characteristic curves represent a relationship between a control signal of an emitter to be predetermined as a function of temperature.

8. The optoelectronic module according to claim 1, wherein the control element comprises a communication interface.

9. The optoelectronic module according to claim 1, comprising a plurality of semiconductor emitter units, each semiconductor emitter unit being driven by the control element.

10. The optoelectronic module according to claim 1, wherein the semiconductor emitter unit has an identifier.

11. The optoelectronic module according to claim 10, wherein the identifier is an optically readable mark.

12. The optoelectronic module according to claim 10, wherein the identifier is stored as a digital ID in the memory unit of the control element.

13. A method comprising the following steps:
A) providing an optoelectronic module with an identifier, wherein the optoelectronic module comprises:
a control element,
at least one temperature sensor, and
at least one semiconductor emitter unit, wherein
the semiconductor emitter unit comprises at least a first emitter and a second emitter,
the first emitter is intended to emit electromagnetic radiation in a first wavelength range,
the second emitter is intended to emit electromagnetic radiation in a second wavelength range different from the first wavelength range,
the control element comprises a memory unit and a driver output for each emitter,
the temperature sensor determines a temperature,
each emitter is assigned a non-linear characteristic curve in the memory unit,
the control element is intended to drive the emitters independently of each other by means of a respective driver output, and
the control element controls the emitters depending on the determined temperature and the respective characteristic curve of the emitter,
B) determining the first and second wavelength ranges and a first and second brightness of the emitters at a first temperature,
C) repeating step B) at a second temperature different from the first temperature,
D) determining a temperature-dependent characteristic curve of each of the first and second wavelength ranges and the first and second brightnesses of each emitter; and
E) reading out the identifier of the module and F) assigning the determined characteristic curves to the identifier.

14. The method according to claim 13, wherein in a step F) the determined characteristic curves are written to the memory unit of the control element.

15. The method according to claim 13, wherein in a step E) determined characteristic curves are transferred to a server of a network for providing the characteristic curves in the network.

* * * * *